(12) United States Patent
Ge

(10) Patent No.: US 8,406,417 B2
(45) Date of Patent: Mar. 26, 2013

(54) OVERVOLTAGE PROTECTION WITH POWER SINK

(75) Inventor: Qiangsheng Charssen Ge, Macungie, PA (US)

(73) Assignee: Microsemi Semiconductor (U.S.) Inc., Austin, TX (US)

( * ) Notice: Subject to any disclaimer, the term of this patent is extended or adjusted under 35 U.S.C. 154(b) by 853 days.

(21) Appl. No.: 12/550,816

(22) Filed: Aug. 31, 2009

(65) Prior Publication Data

US 2011/0051926 A1  Mar. 3, 2011

(51) Int. Cl.
H04M 1/00 (2006.01)
H04M 9/00 (2006.01)
(52) U.S. Cl. ........................................ 379/412
(58) Field of Classification Search ............... 379/412
See application file for complete search history.

(56) References Cited

U.S. PATENT DOCUMENTS

| | | | |
|---|---|---|---|
| 6,188,268 B1 * | 2/2001 | Nayebi et al. | 327/538 |
| 6,922,323 B1 | 7/2005 | Bentley | |
| 2003/0053276 A1 * | 3/2003 | Mutunga et al. | 361/119 |
| 2007/0075147 A1 * | 4/2007 | Ng | 235/492 |
| 2009/0092243 A1 * | 4/2009 | Mitrea et al. | 379/412 |

FOREIGN PATENT DOCUMENTS

EP  0 092 820 A1  11/1983

OTHER PUBLICATIONS

Search Report from European Patent Application No. 10251477.5 dated Dec. 22, 2010.

* cited by examiner

*Primary Examiner* — Alexander Jamal
(74) *Attorney, Agent, or Firm* — Williams, Morgan & Amerson, P.C.

(57) ABSTRACT

A line card includes a subscriber line interface circuit, an interface line, and a first overvoltage protector. The subscriber line interface circuit has a first input terminal operable to receive power at a first reference voltage. The interface line is coupled to the subscriber line interface circuit for interfacing with a subscriber line external to the line card. The first overvoltage protector is coupled to the interface line and referenced to the first reference voltage to provide overvoltage protection responsive to a voltage on the interface line exceeding the first reference voltage by a first predetermined threshold.

27 Claims, 5 Drawing Sheets

OVERVOLTAGE PROTECTION WITH POWER SINK

CROSS-REFERENCE TO RELATED APPLICATIONS

Not applicable.

BACKGROUND

The disclosed subject matter relates generally to telecommunications and, more particularly, to an overvoltage protection circuit with a power sink.

In communications systems, particularly telephony, it is common practice to transmit signals between a subscriber station and a central switching office via a two-wire bi-directional communication channel. A line card generally connects the subscriber station to the central switching office. A line card typically includes at least one subscriber line interface circuit (SLIC) as well as a subscriber line audio-processing circuit (SLAC). The functions of the line card include range from supplying talk battery to performing wake-up sequences of circuits to allow communications to take place.

Subscriber line interface circuits (SLICs) have been developed to provide an interface between a low voltage signal path in a telephone central office and a high-voltage telephone subscriber line. The SLIC provides functions such as offhook detection, ringing signal generation, and battery feed to the subscriber line. The subscriber line consists of a telephone transmission line, including two conductors referred to as A and B or tip and ring, and the subscriber telephone equipment coupled across the tip and ring conductors (i.e., the load). The subscriber line and the subscriber telephone equipment are also referred to as a subscriber loop.

The SLIC provides power from the telephone central office to the subscriber line in response to a received battery voltage. The battery voltage is a DC voltage supplied to the SLIC to power the SLIC and the subscriber line. The SLIC supplies a DC current at the battery voltage to the subscriber line. Superimposed on the DC current are AC signals of audio frequency by which information is conveyed between the subscriber and the central office. The battery voltage is generated at the central office, either by a depletable energy storage device such as a battery or by a DC generator, for supply to the SLIC. In a central office, one battery or DC generator supplies the battery voltage to many SLICs and their associated subscriber loops.

To meet safety requirements it is common to use a positive battery, VBP, along with a negative battery, VBH, to generate sufficient voltage for ringing generation. To save power and reduce power dissipation on the SLIC for short loop applications, a third supply is often used for DC feed along with VBH. The third supply is typically lower in amplitude than VBH, and is often referred to as VBL.

To protect the SLIC from voltage excursions, such as lightning surges or power cross events, a protection scheme is employed to connect the tip or ring line experiencing the event to ground. Typically one protector is employed to track the VBP supply and another protector that tracks the VBH supply.

FIG. 1 is a circuit diagram illustrating a conventional protection circuit 100. In FIG. 1, multiple interface lines 105 for interfacing with external subscriber lines are shown (i.e., designated as TIP1-$n$ and RING1-$n$). Each interface line 105 has protection resistors 110, a negative overvoltage protector 120 referenced to VBH, and a positive overvoltage protector 130 referenced to VBP. Exemplary overvoltage protectors are available commercially, such as a TISP8200M device for the negative overvoltage protector 120 and a TISP8201M for the positive overvoltage protector 130, both offered by Bourns, Inc. of Riverside, Calif. Gate capacitors 125, 135 are provided at the gate inputs of the protectors 120, 130 for maintaining the reference voltage for the protectors 120, 130 during transients.

The negative overvoltage protector 120 initially clips overvoltages close to the VBH value. If sufficient current is available from the overvoltage, then the negative overvoltage protector 120 will crowbar into a low voltage ground referenced on-state condition. As the overvoltage subsides, the high holding current of the negative overvoltage protector 120 prevents DC latchup with the SLIC output current. Similarly, the positive overvoltage protector 130 initially clips positive overvoltages close to the VBP value. If sufficient current is available from the overvoltage, then the positive overvoltage protector 130 will crowbar into a low voltage ground referenced on-state condition. As the overvoltage subsides the SLIC pulls the conductor voltage down to its normal negative value and this commutates the positive overvoltage protector 130 into a reverse biased condition. During an overvoltage transient, increased current may pass through the protection resistors 110, which are positive coefficient devices, causing them to tri-state and thereby isolate the associated interface line 105.

The dual protector protection scheme of FIG. 1 is costly, since each interface line supported by a line card requires two protectors 120, 130 and two relatively expensive gate capacitors 125, 135.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a line card including a subscriber line interface circuit, an interface line, and a first overvoltage protector. The subscriber line interface circuit has a first input terminal operable to receive power at a first reference voltage. The interface line is coupled to the subscriber line interface circuit for interfacing with a subscriber line external to the line card. The first overvoltage protector is coupled to the interface line and referenced to the first reference voltage to provide overvoltage protection responsive to a voltage on the interface line exceeding the first reference voltage by a first predetermined threshold.

Another aspect of the disclosed subject matter is seen in a method for protecting a line card including an interface line for interfacing with an external subscriber lines. The method includes monitoring a voltage on the subscriber line, coupling the subscriber line to ground responsive to determining that the voltage on the subscriber line exceeds a first reference voltage by a first predetermined threshold, and sinking power from the interface line to ground responsive to a voltage on the interface line exceeding the first reference voltage prior to exceeding the first predetermined threshold.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
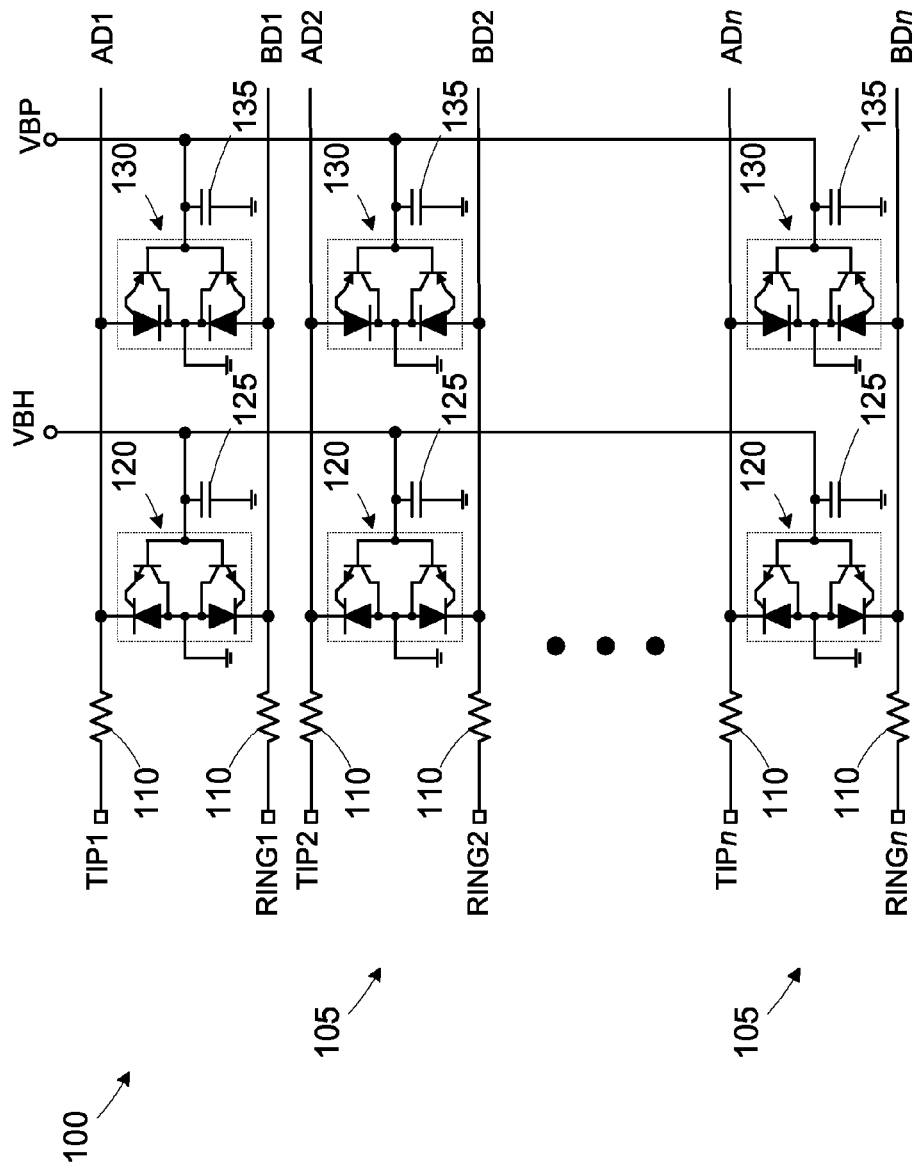
FIG. 1 is a diagram of a conventional protection circuit for a line card.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
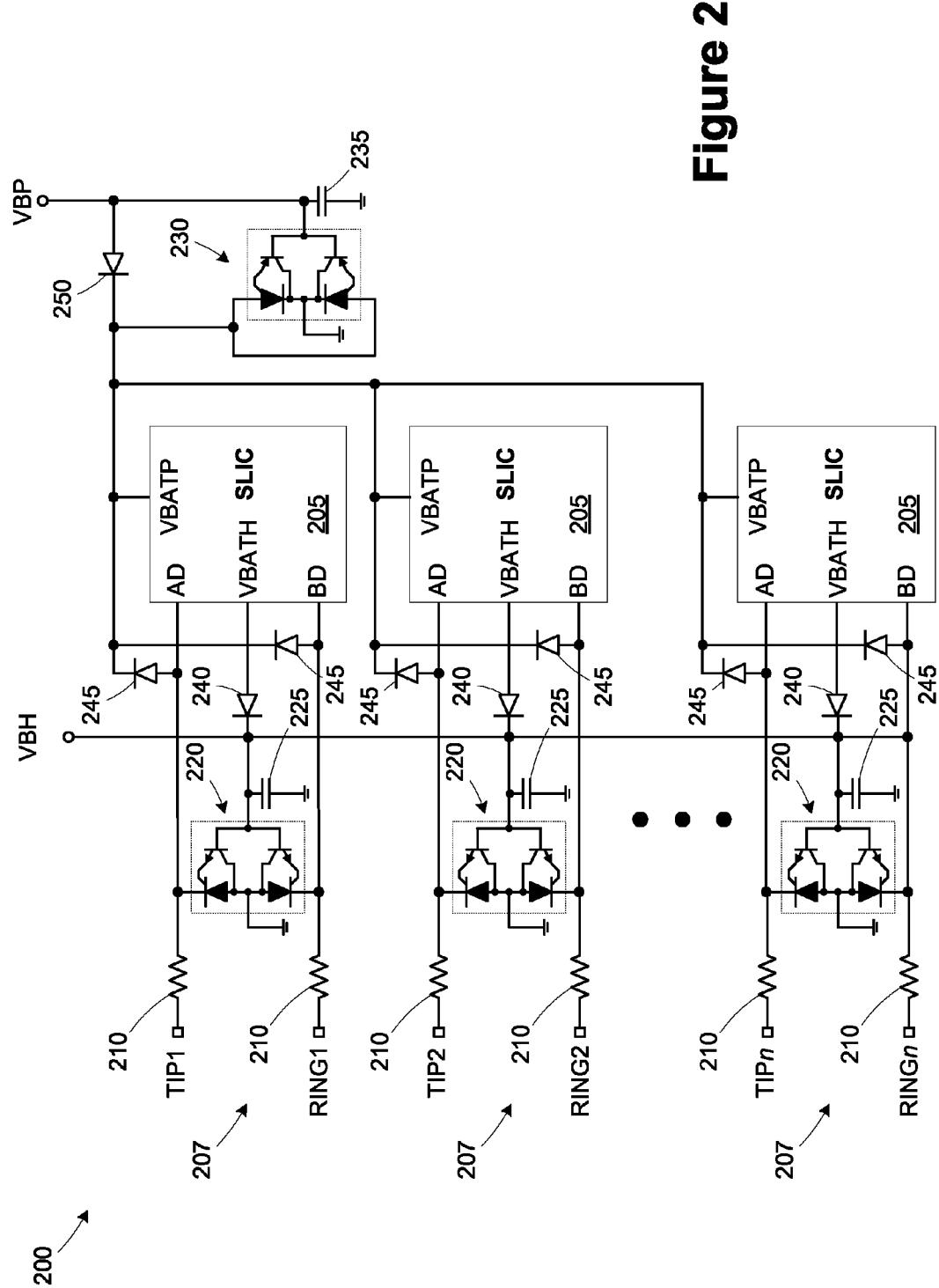
FIG. 2 is a diagram of a protection circuit for a line card employing shared positive protection in accordance with one illustrative embodiment of the present subject matter.

Referring now to the drawings wherein like reference numbers correspond to similar components throughout the several views and, specifically, referring to FIG. 2, the disclosed subject matter shall be described in the context of a simplified diagram of an exemplary line card 200 including a plurality of subscriber line interface circuits (SLICs) 205. Only the elements of the line card 200 used to support a protective function for SLICs 205 are shown. Exemplary SLIC devices 205 may be model Le79271 devices offered by Zarlink Semiconductor, Inc. of Ontario, Canada. Each SLIC 205 has AD and BD input terminals for the tip and ring lines, respectively, and VBATP and VBATH input terminals for the VBP and VBH reference voltages, respectively. Multiple interface lines 207 are represented in FIG. 2 (i.e., designated as TIP1-$n$ and RING1-$n$).

Each interface line 207 has protection resistors 210 and a negative overvoltage protector 220 referenced to VBH. Individual negative overvoltage protectors 220 are used for the VBH reference so that the disruption of one interface line 207 does not disrupt the other lines 207, which could potentially cause abnormal noise or loss of service.

Because the VBP source is typically used only for ringing, disruptions on one external subscriber line are unlikely to cause significant effects on the other subscriber lines. Hence, a shared positive overvoltage protector 230 is used for the VBP reference. The negative overvoltage protectors 220 operate in a conventional manner, in that when voltages on the tip or ring lines exceed VBH in the negative direction, the associated negative overvoltage protector 220 protects the associated line as described above without affecting the other lines 207. The shared positive overvoltage protector 230 performs its protective functions for all of the interface lines 207 in response to one of them having a disruption. Gate capacitors 225, 235 are provided at the gate inputs of the protectors 220, 230.

An isolation diode 240 is provided on the VBATH input terminal of the SLIC 205 to help to trigger the negative overvoltage protector 220 referenced to VBH. Without the diode 240 (i.e., VBH sinks current for normal operation and cannot source current), the VBH supply can be pulled more and more negative without the negative overvoltage protector 220 being triggered. In the illustrated embodiment, similar diodes are provided for the VBATP input terminals for the SLIC 205, but they are integrated into the SLIC 205. Isolation diodes 245 are provided to isolate the tip and ring lines from one another during normal operation. An isolation diode 250 works similarly to the isolation diode 240, but the isolation diode 250 helps trigger the shared positive protector 230 in the event of a positive surge. Without the isolation diode 250, the VBP supply may be pushed more and more positive without the shared positive protector 230 being triggered because the VBP supply can source current during normal operation but cannot sink current.

With the shared positive overvoltage protector 230, the only significant potential for interference between channels is when one channel is hit by a surge while the other channel(s) happened to be in ringing (i.e., actual power ringing and not the silent period of cadenced ringing). Hence, the ringing waveform of the other channels may be affected, however, the line will still be ringing and will not lose service. Typically, only the sound of the ringing may be affected for a short period of time. The shared positive overvoltage protector 230 reduces the cost of the line card 200 and the real estate consumed on the printed circuit board by reducing the number of protectors needed and also the number of gate capacitors 235.

Figure 3:
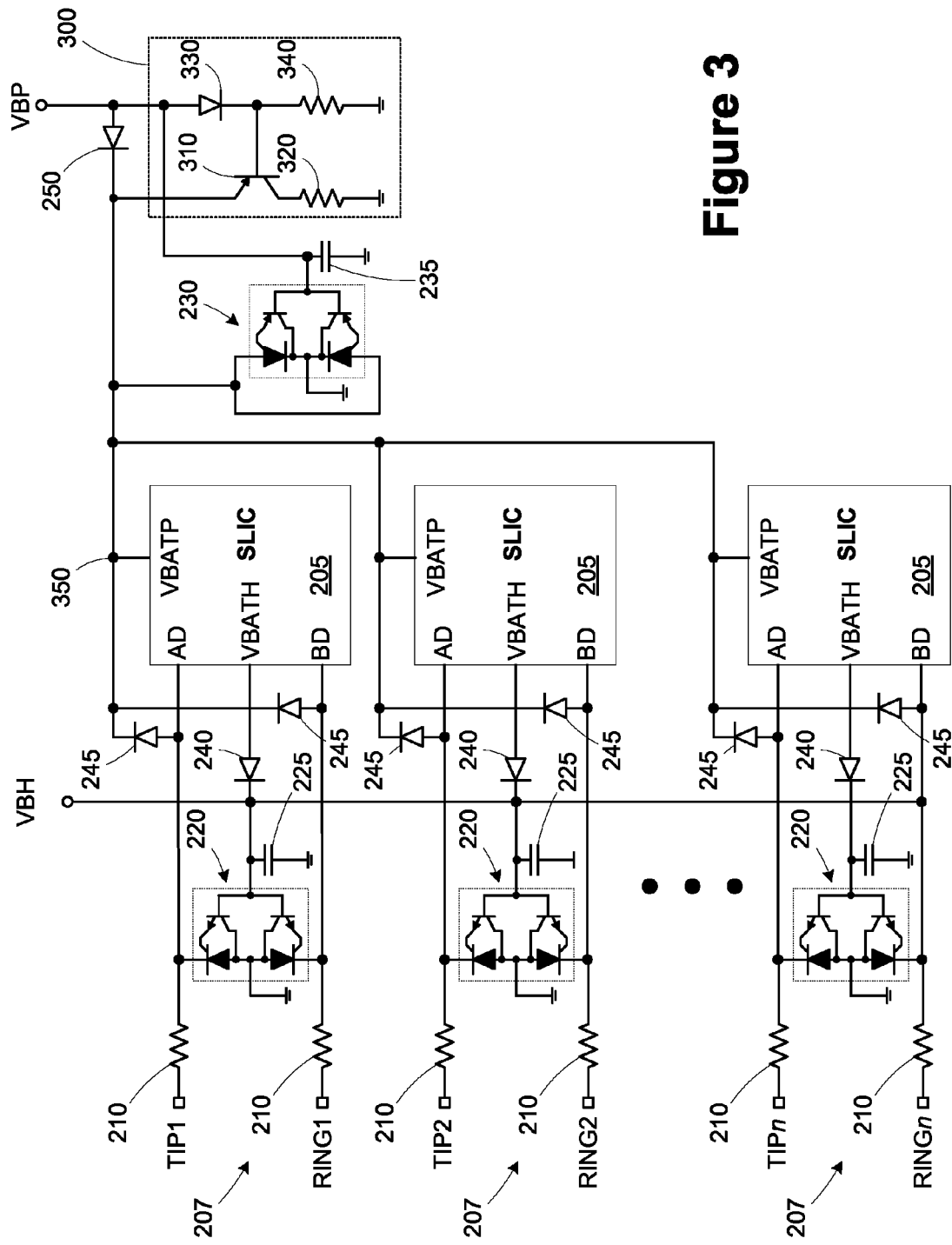
FIG. 3 is a diagram of an embodiment of the protection circuit of FIG. 2 including an additional power sink.

As shown in the embodiment of FIG. 3, the potential for disruption of the other lines 207 if they happen to be ringing while there is VPB referenced disruption may be mitigated by providing a power sink 300 in addition to the shared positive overvoltage protector 230. The power sink 300 provides a surge current path to ground allowing low current surges, such as low level power cross events, to pass through without triggering the positive overvoltage protector 230. Although the power sink 300 is illustrated as being shared across the multiple interface lines 207, it is contemplated that individual power sinks 300 may be distributed such that each interface line 207 has its own power sink 300.

The power sink 300 includes a power transistor 310, a power-off loading and operation limiting resistor 320, a bias diode 330, and a bias resistor 340. The bias diode 330 and bias resistor 340 bias the power transistor 310 so that the gate of the transistor 310 is referenced to a value of VBP less a diode drop. Hence, the power transistor 310 conducts current when the voltage on the node 350 exceeds VBP. As the voltage at node 350 continues to attempt to rise due to a positive disruption, the current conducted by the power transistor 310 increases. The power dissipated in the resistor 320 also increases as $P_{320}=R_{320}*I^2$. The power dissipation in the transistor 310 is reduced from $P_{310}=VBP*I$ without the resistor 320 to $P_{310}=(VBP-R_{320}*I)*I=VBP*I-R_{320}*I^2=VBP*I-P_{320}$ with the resistor 320. Thus the resistor 320 off loads the power dissipation from the power transistor 310. The power transistor 310 saturates when the voltage dropped across the limiting resistor 320 equals VBP less the diode drop of the bias diode 330. Hence, the current dissipated through the power transistor 310 is limited based on the resistance of the limiting resistor 320. Any remaining current from the disruption causes the voltage at node 350 to increase until it reaches VBP plus a diode drop associated with the positive overvoltage protector 230, thereby turning on the positive overvoltage protector 230 to dissipate the additional current.

Hence, the power sink 300 allows current from low level disruptions to be dissipated without triggering the positive overvoltage protector 230. For a lightning surge, the event is instantaneous. For such a positive surge with large current but short duration, the positive overvoltage protector 230 will turn on and take the line 207, along with the positive power supply providing the VBP reference to ground. The power supply will go into a self-protection mode. When the surge disappears the power supply will recover from its protected mode and resume normal supply. The impact to the VBP supply is limited. Depending on the characteristics of the power supply, the impact may be in the order of 100 ms.

For power cross, however, the event can last for an extended time and possibly indefinitely. In the K.20/K.44 and GR1089 standards there are many tests that last 15 minutes, however, in the real world a power cross event could last much longer. For those cases where the power cross levels are high and the source impedances are low, the protection resistors 210 will heat up quickly and transition to a high impedance state. The impact to the VBP supply is manageable. For example, it may take 2 seconds for a 50 ohm PTC to become high impedance under a 230 Vrms/300 ohm power cross. In other words, the VBP supply is disrupted and will be at or near 0 V for about 2 seconds.

For those cases where the power cross level is low and/or the source impedance is high, such as a 230 Vrms/1000 ohm event or a 100 Vrms/600 ohm event, the test duration is 15 minutes. Because of the low current the protection resistors 210 may take an extended time period to heat up and become high impedance. For example, it may take more than 3 minutes for a 50 ohm PTC to become high impedance under a 100 Vrms/600 ohm power cross event. It is possible that protection resistors 210 may never become high impedance to release the positive protector and to release the VBP supply. The power sink 300 illustrated in FIG. 3 helps avoid disrupting the VBP supply for a long time period.

In the event of a positive surge, the power transistor 310 will turn on. If the surge current is less than the capacity of the power sink 300, the positive overvoltage protector 230 will not be triggered, and therefore the surge will not cause disruption to the VBP supply. If the current exceeds the capacity of the power sink 300, the positive overvoltage protector 230 will turn on, taking the VBP supply to ground until the surge event is over, or until the protection resistor 210 become high impedance. As stated above, the surge current exceeding the capacity of the power sink 300 causes the positive overvoltage protector 230 to activate. When the positive overvoltage protector 230 activates, the surge current will jump, resulting in a large current passing through the protection resistor 210, forcing it to become high impedance in a short time. The current through the protection resistor 210 at the point at which the positive overvoltage protector 230 turns on is at the maximum capacity of power transistor 310, which is limited by the limiting resistor 320, at the current level about $VBP/R_{320}$. This same current is going through the protection resistor 210 as $(V_{TIPN}-V_{350})/R_{210}$ or about $(V_{TIPN}-VBP)/R_{210}$. Therefore $VBP/R_{320}=(V_{TIPN}-VBP)/R_{210}$ $V_{TIPN}$ can be determined by $V_{TIPN}=VBP(1+R_{210}/R_{320})$. When the positive overvoltage protector 230 turns on, the node 350 is taken to ground. The current through the protection resistor 210 will be $(V_{TIPN}-0)/R_{210}=V_{TIPN}/R_{210}$. With the known $V_{TIPN}$ the current can be determined as $V_{TIPN}/R_{210}=VBP(1+R_{210}/R_{320})/R_{210}=VBP/R_{210}+VBP/R_{320}$. Therefore, the current jumps from $VBP/R_{320}$ to $(VBP/R_{210}+VBP/R_{320})$. If VBP=100V, $R_{210}$=50 ohms, and $R_{320}$=100 ohms, the current will jump from 1 ampere to 3 amperes.

The above analysis implies that the power sink 300 with its current capacity of $VBP/R_{320}$ is blocking otherwise surge current of $(VBP/R_{210}+VBP/R_{320})$ from triggering the positive protector. Since values of $R_{210}$=50 ohms and $R_{320}$=100 ohms are typical, power sink 300 is blocking a surge current 3 times its current capability from triggering the positive overvoltage protector 230. In another words, power sink 300 effectively creates a high threshold. Below the threshold, the positive overvoltage protector 230 will not be triggered. If a long-lasting event that does cross the threshold occurs, the large current will quickly force the protection resistor 210 into high impedance. Once the protection resistor 210 is in high impedance, it will release the shared positive overvoltage protector 230 and the VBP supply as well. The potential interruption from a low level (i.e., fault current less than $VBP/R_{210}+VBP/R_{320}$) long lasting fault event is avoided. The potential interruption from a high level long lasting fault event is significantly limited only to the very initial portion of the fault event (i.e., until the protection resistor 210 is forced into high impedance).

Because the power transistor 310 is a relatively large transistor, it can pass through a large current from emitter to collector, $I_{EC}$, but with typically a low common-emitter current gain, β. The collector current is approximately β times the base or gate current. The gate current can be significant as $I_G=I_{EC}/β$. The bias circuit including the diode 330 and the bias resistor 340 will have to constantly provide no less than the peak gate current. This situation may consume a significant levels of power, as most of time, there is no surge fault. If VBP=100 V and $R_{320}$=100 ohms, the peak $I_{EC}$=1 A. If β=10, then the gate current $I_G$=100 mA. The power dissipate in the resistor 340 would have to be at least $I_G$*VBP or 100 mA*100V=10 watts.

Figure 4:
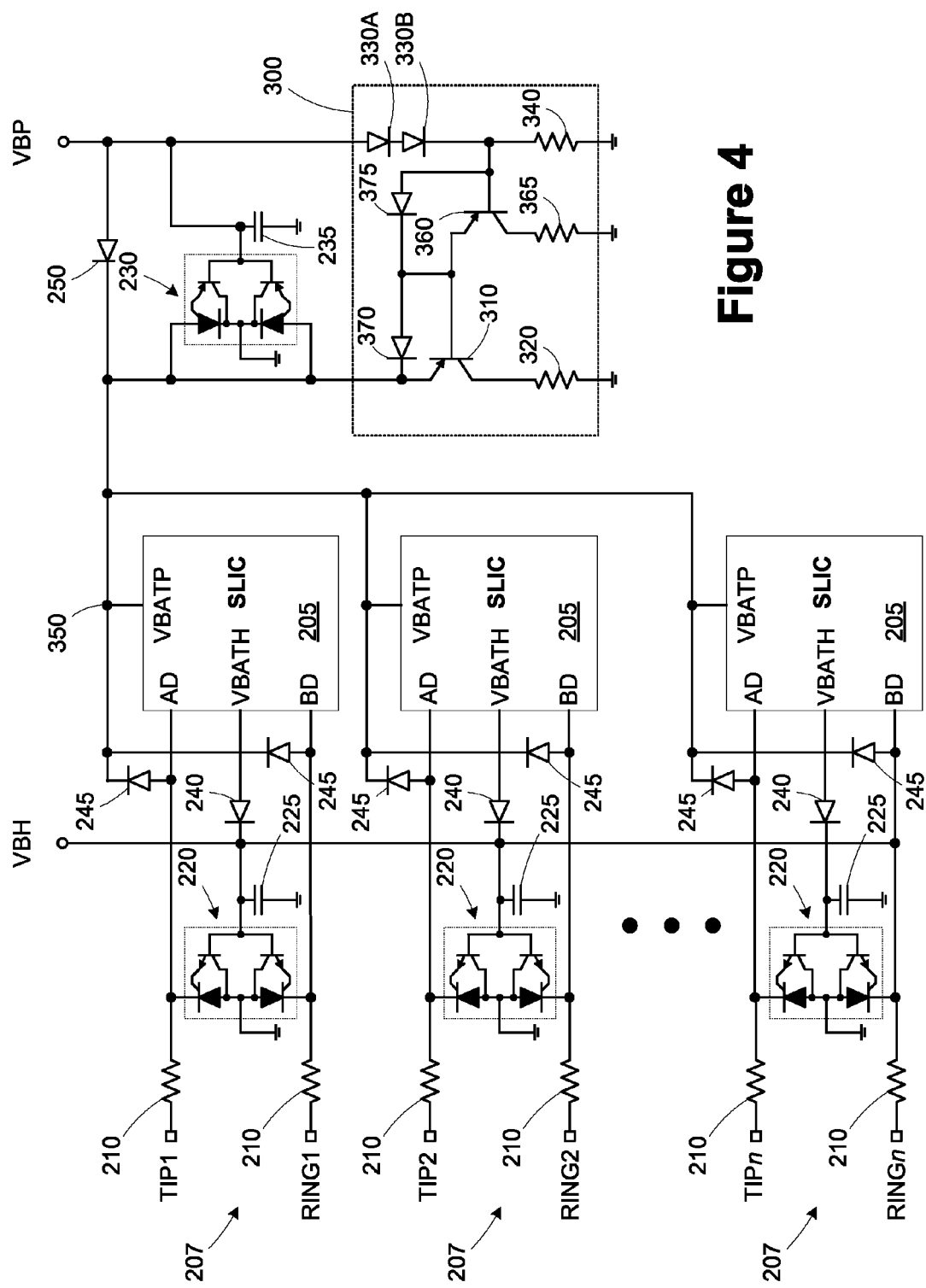
FIG. 4 is a diagram of an embodiment of the protection circuit of FIG. 3 including an additional transistor in the sink circuit for reducing the constant gate current requirements.

As shown in another embodiment illustrated in FIG. 4, the gate current may be reduced by providing an enable transistor 360 and its associated resistor 365 in the power sink 300. The enable transistor 360 is smaller in size than the power transistor 310 with a higher β. The bias current is now greatly reduced from $I_{G310}$ to $I_{G310}/β_{365}$. Assuming $β_{365}$ is 50, the bias current will be $I_{G310}/β_{365}$=100 mA/50=2 mA. The bias power on the bias resistor 340 is reduced from 10 watts to 2 mA*100 V=0.2 watts. Two bias diodes 330A, 330B are provided to compensate for the transistors 310, 360 with respect to the VBP reference. When the voltage at the node 350 goes above VBP, the power transistor 310 begins conducting along with the enable transistor 360. The enable transistor 360 provides the necessary gate current for the power transistor 310. However, during normal operation with no surge transients the transistors 310, 365 are off, leaving only the bias circuit including diodes 330A, 330B and the resistor 340 active. Protection diodes 370, 375 are provided to protect the transistors 310, 360 from reverse current flow during a transient.

Figure 5:
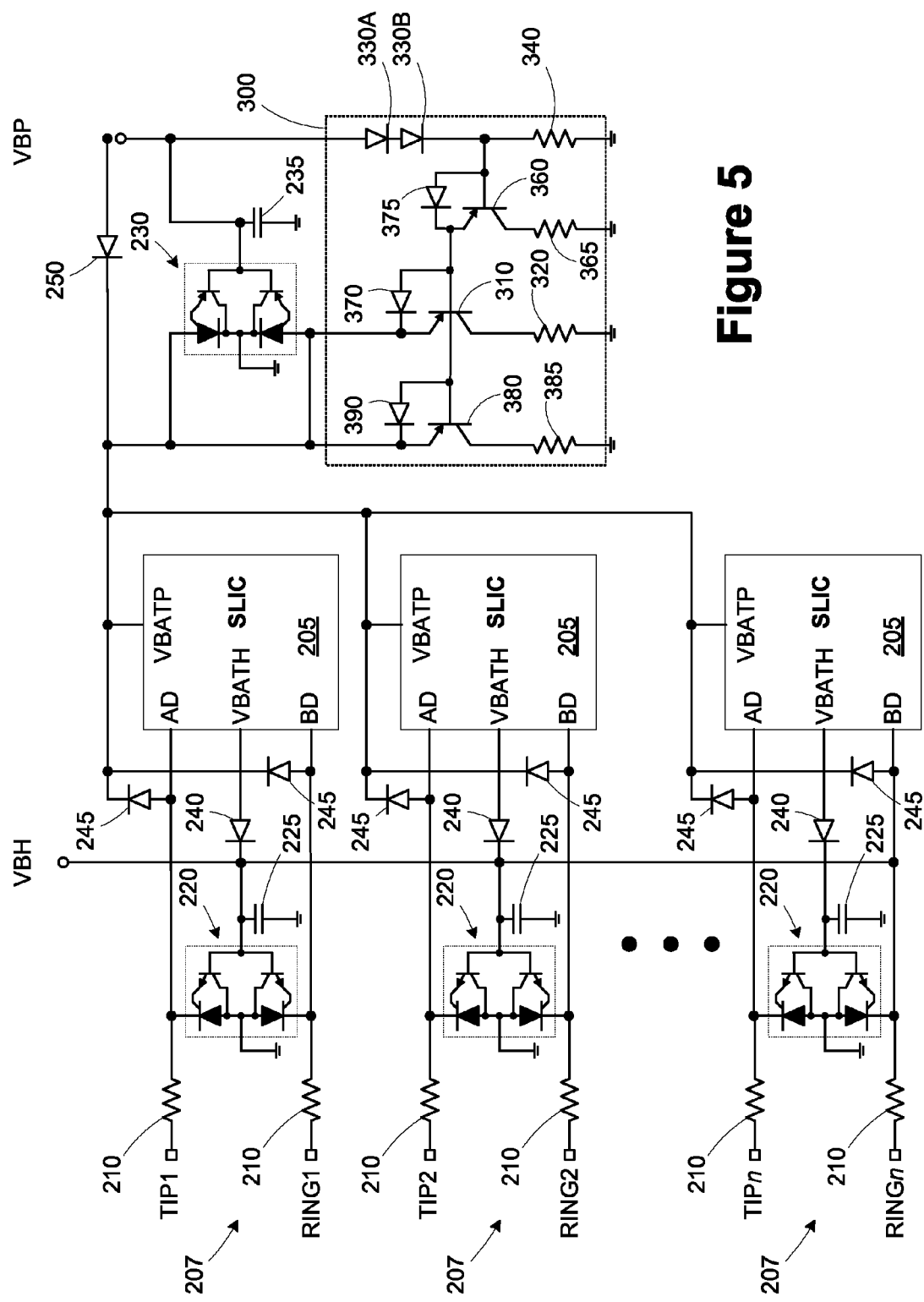
FIG. 5 is a diagram of an embodiment of the protection circuit of FIG. 4 including an additional power transistor in the sink circuit for increasing the current shunting capacity.

The power dissipating capacity of the power sink 300 is limited by the capacity of the power transistor 310. In yet another embodiment illustrated in FIG. 5, the capacity of the power sink 300 may be increased by providing one or more additional power transistors 380 and associated limiting resistors 385 in parallel with the power transistor 310 and its limiting resistor 320. An additional protection diode 390 is also provided for the power transistor 380. If the power transistor 380 is the same size as the power transistor 310, the current carrying capacity of the power sink 300 is effectively doubled, allowing it to handle even higher level transients without activating the positive overvoltage protector 230, and if the surge event does cross the increased current threshold, the current through the protection resistor 210 is further increased, forcing it into high impedance in an even shorter time.

Sharing protection of the SLICs 205 from positive transients using the shared positive overvoltage protector 230 reduces cost for the line card 200 by reducing the number of protectors 230 and their associated gate capacitors 235. Printed circuit board area savings is also achieved. These advantages may be realized with minimal impact to the overall operation of the line card 200. The interference caused by using the shared positive overvoltage protector 230 typically happen only when the disturbed line is in ringing, resulting in a reduction in the AC ringing amplitude. Such disturbances may only happen during a lightning event that occurs during ringing or a high current power cross that initially occurs in the middle of the ringing cycle. The affected duration for a lightning strike is only about 100 ms and up to about 2-3 seconds for a power cross fault. The affected duration for a power cross fault may be reduced by increasing the sinking current capability of the power sink 300. In case of an interruption to the VBP power supply while a different interface line 207 happens to be in ringing, the resulting ringing amplitude reduction may reduce the loudness of the phone in ringing or the ringing amplitude may be too low to ring the phone during the disruption, however, ringing is still going on and there will be no service drop. In other words, the distortions to the ringing typically affect only one ringing cadence cycle.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

I claim:
1. A line card, comprising:
   a subscriber line interface circuit having a first input terminal operable to receive power at a first reference voltage;
   an interface line coupled to the subscriber line interface circuit for interfacing with a subscriber line external to the line card;
   a first overvoltage protector coupled to the interface line and referenced to the first reference voltage to provide overvoltage protection responsive to a voltage on the interface line exceeding the first reference voltage by a first predetermined threshold; and
   a power sink coupled to the interface line and arranged to provide a bypass path to ground for current up to a predetermined current limit responsive to a voltage on the interface line exceeding the first reference voltage prior to exceeding the first predetermined threshold, said power sink comprising;
      a power transistor coupled between the interface line and ground;
      a limiting resistor in series with the power transistor; and
      a bias circuit coupled to a sate of the power transistor,
      wherein said predetermined current limit is a function of the value of said limiting resistor.

2. The line card of claim 1, wherein the gate is referenced to the first reference voltage.

3. The line card of claim 2, wherein the bias circuit further comprises:
   a bias diode coupled to receive the first reference voltage; and
   a bias resistor coupled to the bias diode; wherein the gate of the power transistor is coupled to a node defined between the bias diode and the bias resistor.

4. The line card of claim 1, wherein the power sink comprises:
   an enable transistor coupled to the gate of the power transistor and having a gate referenced to the first reference voltage.

5. The line card of claim 4, wherein the bias circuit further comprises:
   at least one bias diode coupled to receive the first reference voltage; and
   a bias resistor coupled to the bias diode, wherein a gate of the enable transistor is coupled to a node defined between the bias diode and the bias resistor.

6. The line card of claim 2, wherein the power transistor comprises a plurality of power transistors in parallel.

7. The line card of card of claim 1, further comprising at least one protection resistor coupled to the interface line.

8. The line card of claim 1, wherein the first reference voltage comprises a positive reference voltage.

9. The line card of claim 1, wherein the first overvoltage protector includes a first gate input terminal coupled to receive the first reference voltage, further comprising a first gate capacitor coupled to the first gate input terminal.

10. The line card of claim 1, wherein the first overvoltage protector is operable to provide overvoltage protection by grounding the interface line.

11. A line card, comprising:
a plurality of subscriber line interface circuits each having a first input terminal operable to receive power at a first reference voltage;
a plurality of interface lines each coupled to one of the subscriber line interface circuits for interfacing with subscriber lines external to the line card;
a first overvoltage protector coupled to the interface lines and referenced to the first reference voltage to provide overvoltage protection responsive to a voltage on at least one of the interface lines exceeding the first reference voltage; and
a power sink coupled to the interface lines and arranged to provide a bypass path to ground for current up to a predetermined current limit responsive to a voltage on at least one of the interface lines exceeding the first reference voltage prior to exceeding the first predetermined threshold, said power sink comprising:
a power transistor coupled between the interface line and ground;
a limiting resistor in series with the power transistor; and
a bias circuit coupled to a gate of the power transistor, wherein said predetermined current limit is a function of the value of said limiting resistor.

12. The line card of claim 11, wherein the gate is referenced to the first reference voltage.

13. The line card of claim 12, wherein the bias circuit further comprises:
a bias diode coupled to receive the first reference voltage; and
a bias resistor coupled to the bias diode; wherein the gate of the power transistor is coupled to a node defined between the bias diode and the bias resistor.

14. The line card of claim 11, wherein the power sink comprises:
an enable transistor coupled to the gate of the power transistor and having a gate referenced to the first reference voltage.

15. The line card of claim 14, wherein the bias circuit further comprises:
at least one bias diode coupled to receive the first reference voltage; and
a bias resistor coupled to the bias diode, wherein a gate of the enable transistor is coupled to a node defined between the bias diode and the bias resistor.

16. The line card of claim 12, wherein the power transistor comprises a plurality of power transistors in parallel.

17. The line card of card of claim 11, further comprising at least one protection resistor coupled to each of the interface lines.

18. The line card of claim 11, wherein the first reference voltage comprises a positive reference voltage.

19. The line card of claim 11, wherein the first overvoltage protector includes a first gate input terminal coupled to receive the first reference voltage, further comprising a first gate capacitor coupled to the first gate input terminal.

20. The line card of claim 11, wherein the first overvoltage protector is operable to provide overvoltage protection by grounding the interface lines.

21. The line card of claim 11, wherein the subscriber line interface circuits each have a second input terminal operable to receive power at a second reference voltage, further comprising:
a plurality of second overvoltage protectors referenced to the second reference voltage, wherein each of the second overvoltage protectors is coupled to an associated one of the interface lines and is operable to provide overvoltage protection responsive to a voltage on the associated interface line exceeding the second reference voltage.

22. The line card of claim 21, wherein the first voltage source comprises a positive voltage source, and the second voltage source comprises a negative voltage source.

23. The line card of claim 21, wherein the first overvoltage protector includes a first gate input terminal coupled to receive the first reference voltage and the second overvoltage protectors each include a second gate input terminal coupled to receive the second reference voltage, further comprising:
a first gate capacitor coupled to the first gate input terminal; and
a plurality of second gate capacitors, each coupled to one of the second gate input terminals.

24. The line card of claim 21, wherein the first overvoltage protector is operable to provide overvoltage protection by grounding the interface lines responsive to a voltage on at least one of the interface lines exceeding the first reference voltage, and the second overvoltage protectors are each operable to provide overvoltage protection by grounding its associated interface line responsive to a voltage on the associated interface lines exceeding the second reference voltage.

25. A protection circuit, comprising:
a first terminal operable to receive a first reference voltage;
a second terminal operable to receive a second reference voltage;
an interface line for interfacing with an external subscriber line;
a first overvoltage protector coupled to the interface line and referenced to the first reference voltage to provide overvoltage protection responsive to a voltage on the interface line exceeding the first reference voltage by a first predetermined threshold; and
a power sink coupled to the interface line and arranged to provide a bypass path to ground for current up to a predetermined current limit responsive to a voltage on the interface line exceeding the first reference voltage prior to exceeding the first predetermined threshold, said power sink comprising:
a power transistor coupled between the interface line and ground;
a limiting resistor in series with the power transistor; and
a bias circuit coupled to a gate of the power transistor, wherein said predetermined current limit is a function of the value of said limiting resistor.

26. A method for protecting a line card including an interface line for interfacing with an external subscriber line, comprising:
monitoring a voltage on the subscriber line;
coupling the subscriber line to ground responsive to determining that the voltage on the subscriber line exceeds a first reference voltage by a first predetermined threshold; and sinking power from the interface line to ground responsive to a voltage on the interface line exceeding the first reference voltage prior to exceeding the first predetermined threshold using a power sink, the power sink comprising:
a power transistor coupled between the interface line and ground;
a limiting resistor in series with the power transistor; and
a bias circuit coupled to agate of the power transistor, wherein said predetermined current limit is a function of the value of said limiting resistor.

27. The method of claim 26, wherein the first reference voltage comprises a positive reference voltage.

* * * * *